(12) United States Patent
Vijendra et al.

(10) Patent No.: US 7,746,844 B1
(45) Date of Patent: *Jun. 29, 2010

(54) METHOD AND APPARATUS FOR ANALYSIS OF VOIP NETWORK PERFORMANCE

(75) Inventors: Sudhir Vijendra, White Plains, NY (US); Patricia Florissi, Briarcliff Manor, NY (US)

(73) Assignee: EMC Corporation, Hopkinton, MA (US)

( * ) Notice: Subject to any disclaimer, the term of this patent is extended or adjusted under 35 U.S.C. 154(b) by 374 days.

This patent is subject to a terminal disclaimer.

(21) Appl. No.: 11/823,930

(22) Filed: Jun. 29, 2007

(51) Int. Cl.
*H04L 12/28* (2006.01)
*H04M 7/00* (2006.01)
*G06F 11/30* (2006.01)
*G21C 17/00* (2006.01)

(52) U.S. Cl. .................. 370/351; 379/219; 702/183
(58) Field of Classification Search ......... 370/351–356; 379/219
See application file for complete search history.

(56) References Cited

U.S. PATENT DOCUMENTS

| | | | |
|---|---|---|---|
| 6,868,367 B2 * | 3/2005 | Yemini et al. ............... 702/183 |
| 7,107,185 B1 | 11/2005 | Yemini |
| 2003/0059021 A1 * | 3/2003 | Meyerson et al. .......... 379/219 |
| 2005/0078690 A1 * | 4/2005 | DeLangis .................... 370/401 |
| 2005/0192965 A1 * | 9/2005 | Ferreira et al. ................. 707/9 |
| 2006/0239271 A1 * | 10/2006 | Khasnabish et al. .... 370/395.21 |
| 2007/0133780 A1 * | 6/2007 | Berner et al. .......... 379/265.01 |

OTHER PUBLICATIONS

U.S. Appl. No. 11/325,109, W. Stuart Mackie.

\* cited by examiner

*Primary Examiner*—Seema S Rao
*Assistant Examiner*—Xavier Szewai Wong
(74) *Attorney, Agent, or Firm*—Krishnendu Gupta; Joseph D'Angelo

(57) ABSTRACT

A method, apparatus and computer product for modeling and analyzing performance of a Voice-over-IP (VoIP) configuration, composed of a plurality of components, is disclosed. The method comprises the step of representing selected ones of the plurality of components and relationships among the selected components, wherein said component representations are selected from the group of configuration non-specific representations consisting of: VoIP-DHCP Service, VoIP-CallOperation Service, VoIP_Signaling Service, VoIP_MediaGateway Service and VoIP_SIP Service, and wherein the representations of relationships are selected from the group of configuration non-specification representations consisting of: Hostedby/HostsServices and Integrates/IntegratedIn, providing a mapping between a plurality of first events and a plurality of second events occurring in the selected components, the mapping representing the relationships along which the first events propagate among the selected components, and determining at least one first event based on at least one of the plurality of second events by determining a measure between each of a plurality of relationship values associated with the plurality of first events and the plurality of second events.

19 Claims, 7 Drawing Sheets

| S \ P | HOST DOWN | EXCESSIVE JITTER | EXCESSIVE DELAY | MOS SCORE | EXCESSIVE LOSS |
|---|---|---|---|---|---|
| DOWN | 1 | 1 | 1 | 1 | 1 |
| NON-OPTMAC PERF. | 0 | 1 | 1 | 1 | 1 |

FIG. 4

METHOD AND APPARATUS FOR ANALYSIS OF VOIP NETWORK PERFORMANCE

RELATED APPLICATIONS

This application is related to the patent application entitled "Method and Apparatus for Representing, Managing and Problem Reporting in VoIP Networks," filed in the US Patent and Trademark Office on Jul. 3, 2006, and assigned Ser. No. 11/325,109, and to patent application entitled "Method and Apparatus for Management and Analysis of Services in VoIP Networks," filed in the US Patent and Trademark Office on Jun. 29, 2007, and assigned Ser. No. 11/824,238, the contents of both of which are incorporated by reference herein.

A portion of the disclosure of this patent document contains illustrations of EMC Smarts network model, which is subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to Voice over Internet Protocol (VoIP) networks and more particularly, to methods and apparatus for analyzing VoIP network performance.

BACKGROUND OF THE INVENTION

Voice over IP (VoIP) is an emerging technology to package analog audio signal, such as those transmitted over a Public Switched Telephone Network (PSTN), as information packets and transmit the packets over one or more networks.

FIG. 1 illustrates a VoIP configuration or network 100 wherein conventional packet-switched network 110, e.g., the Internet, provides service link between telephone 140.1 and 140.2. In this illustrated example, a user, at telephone 140.1 enters the telephone number of telephone 140.2 and the information is provided through router 135.1 to gateway 120.1. Gateway 120.1 provides signals, through router 130 to gateway 120.2 to establish the connection, i.e., pathways within network 110. After the connection is established, telephone 140.1 communicates with telephone 140.2 through the established transport connection 138.

With the increasing development of, and dependency upon, networks to provide services, such as VoIP, to businesses and their customers, the need for proper management and operation of the network is increasing more important. Not only does the VoIP service provide a less costly means of providing voice services, it is inherently more reliable in that the voice packets may be dynamically routed in case of fails occurring in the network.

The above referred-to patent application Ser. No. 11/325,109 discloses a method for managing aspects of a VoIP network by modeling components within the VoIP network and determining a physical status of the network by analyzing detected or observed events and correlating these events with most-likely causes of the detected or observed events. Such an analysis is referred-to as a root-cause analysis and, more specifically, an availability root cause analysis. VoIP availability root-cause analysis and other similar analysis are presented in detail in the referred-to patent application and need not be discussed in detail herein.

However, while an availability analysis will determine whether a component, device or element within the VoIP network is not performing correctly, and, thus, impacting overall performance, conditions within the VoIP network may arise wherein the network elements are performing within their desired operational ranges but some degradation in the performance may be experienced because of other conditions occurring within the network.

Hence, there is a need in the industry for a method and system for representing, analyzing and determining root cause of errors in the performance of the VoIP network and the impact of such errors.

SUMMARY OF THE INVENTION

A method, apparatus and computer product for modeling and analyzing performance of a Voice-over-IP (VoIP) configuration, composed of a plurality of components, is disclosed. The method comprises the step of representing selected ones of the plurality of components and relationships among the selected components, wherein said component representations are selected from the group of configuration non-specific representations consisting of: VoIP-DHCP Service, VoIP-CallOperation Service, VoIP_Signaling Service, VoIP_MediaGateway Service and VoIP_SIP Service, and wherein the representations of relationships are selected from the group of configuration non-specification representations consisting of: Hostedby/HostsServices and Integrates/IntegratedIn, providing a mapping between a plurality of first events and a plurality of second events occurring in the selected components, the mapping representing the relationships along which the first events propagate among the selected components, and determining at least one first event based on at least one of the plurality of second events by determining a measure between each of a plurality of relationship values associated with the plurality of first events and the plurality of second events.

Other embodiments of the invention include a computerized device, configured to process all of the method operations disclosed herein as embodiments of the invention. In such embodiments, the computerized device includes a memory system, a processor, a communications interface and an interconnection mechanism connecting these components. The memory system is encoded with a load manager (or store process) application that when performed on the processor, produces a load manager (or store) process that operates as explained herein within the computerized device to perform all of the method embodiments and operations explained herein as embodiments of the invention.

Other arrangements of embodiments of the invention that are disclosed herein include software programs to perform the method embodiment steps and operations summarized above and disclosed in detail below. More particularly, a computer program product is disclosed that has a computer-readable medium including computer program logic encoded thereon that when performed in a computerized device provides associated operations explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of storage area network management servers, hosts or other entities can also provide the system of the invention. The system of the invention can be distributed between many software processes on several computers, or all processes could run on a small set of dedicated computers or on one computer alone.

DETAILED DESCRIPTION OF THE FIGURES

FIG. 4 illustrates a causality matrix relating causing events and observed events associated with the VoIP model shown in FIG. 2B;

Figure 1:
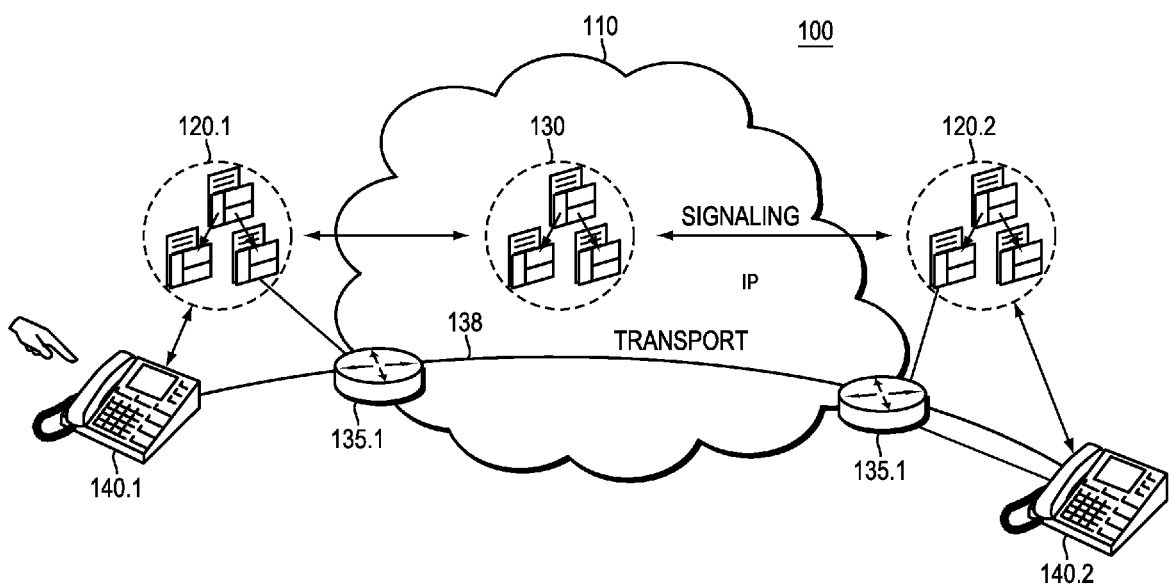
FIG. 1 illustrates a conventional VoIP network.

It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have been used to identify similar elements.

DETAILED DESCRIPTION OF THE INVENTION

Figure 2A:
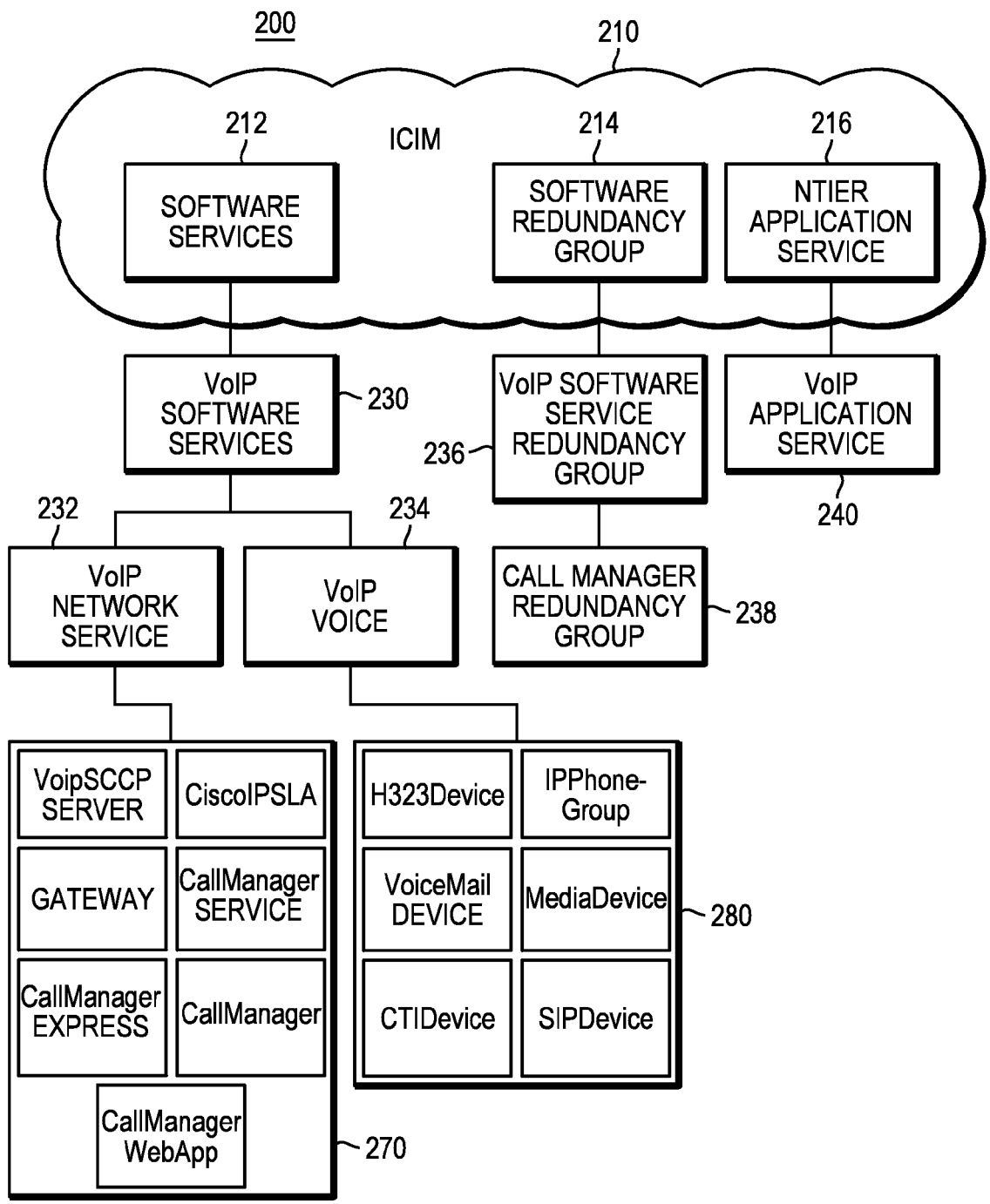
FIG. 2A illustrates an applicable portion of a known VoIP model.
Figure 2B:
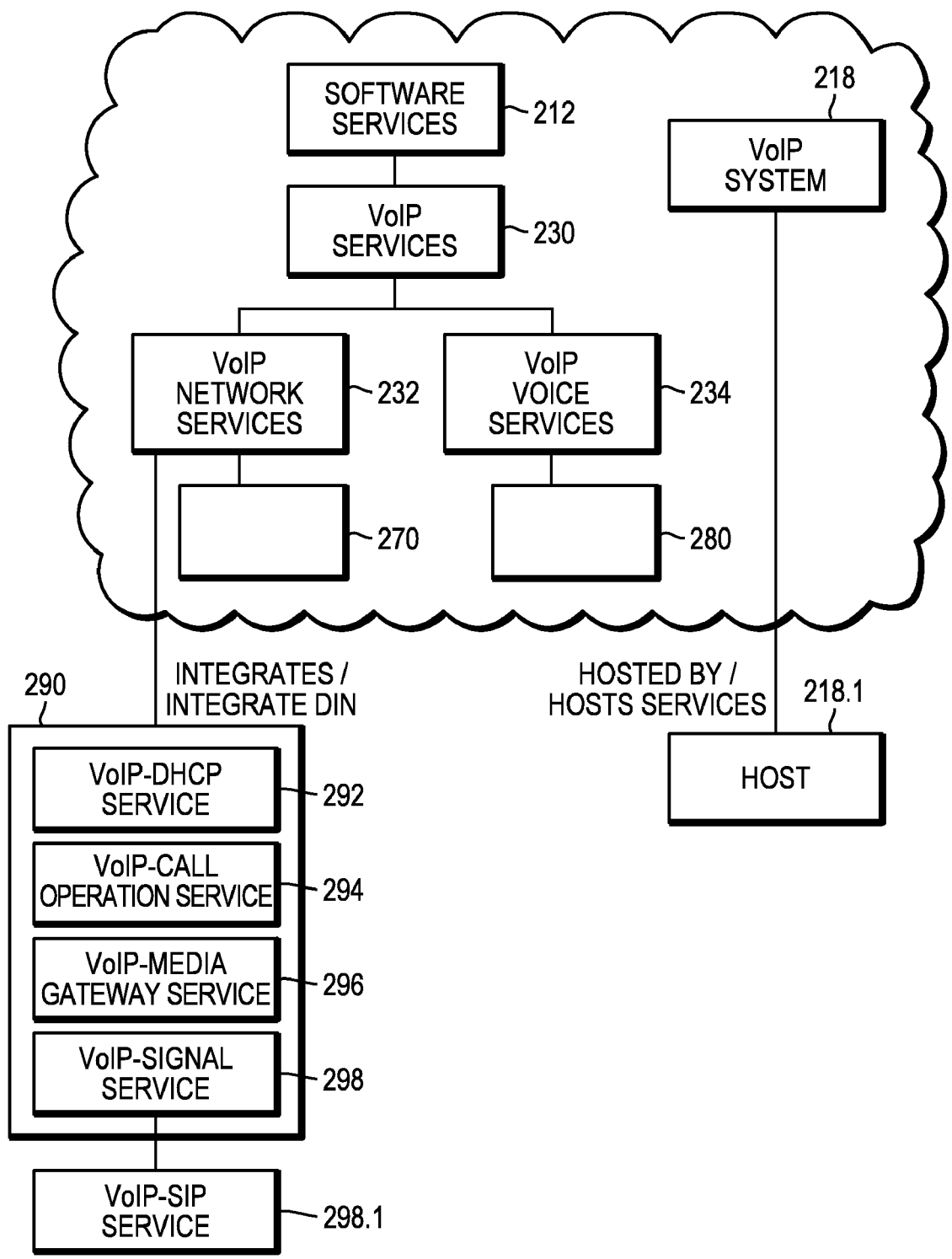
FIG. 2B illustrates an extension of the VoIP model shown in FIG. 2A in accordance with the principles of the present invention.

FIG. 2A illustrates an exemplary embodiment of a VoIP software-based model and FIG. 2B illustrates an extension of the model shown in FIG. 2A in accordance with the principles of the present invention. Referring to FIG. 2A, the model 200 shown is an extension of known network models, such as the EMC Smarts Common Information Model (ICIM), or similarly defined or pre-existing CIM-based model and adapted, herein, for the VoIP network. EMC and SMARTS are trademarks of EMC Corporation, Inc., having a principle place of business in Hopkinton, Ma, USA. The EMC model is an extension of the well-known DMTF/SMI model. A discussion of the EMC model's application to VoIP networks is presented at least in the commonly-owned U.S. patent application Ser. No. 11/263,689, now U.S. Pat. No. 7,107,185, issued on Nov. 1, 2005 to Yemini, Y., et al., and its application to VoIP networks is discussed in the aforementioned related U.S. patent application Ser. No. 11/325,109, the contents of both of which are incorporated by reference herein.

Referring to FIG. 2A, an exemplary abstract model 200 of the VoIP infrastructure section of network 100 (FIG. 1) is shown. The existing ICIM model 210 includes at least the elements SoftwareServices 212, SoftwareReducdnacyGroup 214, N-TierApplicationService 216, which represent elements of a network system. For example, the object Software-Services represents the attributes and properties associated with a collection of services that represent operations such as call processing, music-on-hold, etc. In addition to the known objects, model 210 includes at least the objects VoIPSoftwareService 230, VoIPSoftwareServiceRedundancyGroup 236, and VoIPApplicationService 240. The element VoIPSoftwareService 230 represents attributes and properties associated with a collection of services that comprise a VoIP application subsystem. VoIPSoftwareServiceRedundancyGroup 236 represents a collection of services that provide resilient VoIP services to some set of IP telephones or other VoIP signaling entities. VoIPSoftwareService 230, VoIPServiceRedundancyGroup 236, and VoIPApplicationService 240, objects represent configuration, i.e., network, non-specific representations of the attributes and parameters of the associated hardware and further inherits the attributes and parameters of associated class and subclass. Similarly, the exemplary model shown is not related to any specific configuration and the illustrated relationships between the objects are not associated with any specification VoIP configuration.

Objects associated with VoIPNetworkServices 232 and VoipVoiceService 234, include the attributes or properties associated with the network aspects of the VoIP service and the voice aspects of the VoIP service, respectively. For example, managing the physical gateway is associated with a network service, as shown in block 270, and voice mail service is associated with the voice service, as shown in block 280. Devices providing either voice services or acting as client endpoints in the VoIP system are considered VoIPVoiceServices, whereas elements involved in the transmission and/or routing of voice data traffic are considered VoIPNetworkServices. For example, object H323Devices H.323 Devices represents codecs and tools for conducting multimedia conference calls and object CTIDevices represents Computer Telephony Integration services, such as conducting phone calls in coordination with another application (e.g.: integrated whiteboard and audio conversations).

Model 210 also includes object VoIPSystem or UnitarycomputerSyattributes and properties associated with a system or host running on one or more applications that support VoIP. The ICIM model 210 includes element or object VoIPSystem or Unitary Computer System 218, which presents attributes and properties of the physical elements, i.e., processors, and processing systems, of the network. For example, host object 218.1 represents a processing system that upon which aspects of the VoIP service or application reside. Such processing systems may be based on, for example, Pentium processors. Pentium is a registered Trademark of Intel Corporation.

To accommodate VoIP service performance attributes, the VoIP_NetworkServices object 232 is extended to include the new object VoIP_PerformanceService 290 object (see FIG. 5B). The VoIP_PerformanceService object 290 represents attributes and properties associated with a collection of performance parameters or characteristics of a VoIP application subsystem.

In this illustrated example, specific network performance services may be represented by the VoIP-DHCP Service object 292, VoIP-CallOperation Service object 294, VoIP_Signaling Service object 296 and the VoIP_MediaGateway Service object 298. The VoIP_Signaling Service object 260 may further include a VoIP_SIP Service object 298.1. The VoIP_Signaling Service object describes properties and attributes associated with the VoIP signaling function. The VoIP-CallOperation Service object 294 describes properties and attributes associated with the VoIP call. The VoIP_MediaGateway Service object 298 describes the properties and attributes of the gateway servicing the VoIP connections. Gateways typically provide a path between VoIP networks and older POTS (Poor Old Telephone System) or TDM telephone networks. The VoIP_SIP Service object 298.1 defines the properties and attributes of SIP device handling SIP protocol requests.

Figure 3:
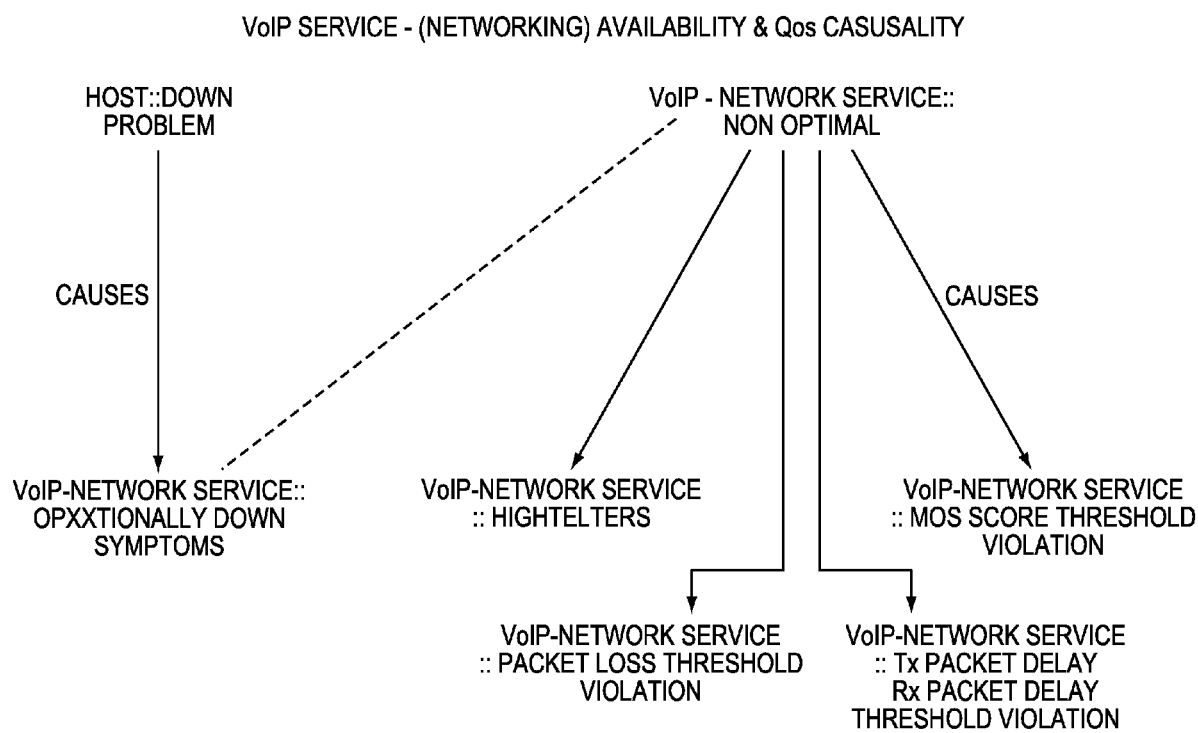
FIG. 3 illustrates a causality graph relating causing events and observed events associated with the VoIP model shown in FIG. 2B.

FIG. 3 illustrates an exemplary causality graph or map associated with the VoIP service model shown in FIG. 2. In this illustrative example, when a host is determined to be in a Down condition (e.g., non-operational), then the VoIP_Network Service is effected by is effectively also operationally down or not-available. Similarly, when a VoIP_Network Service is determined to be operating in a sub- or non-optimal manner, the non-optimal performance may be caused by the detection or determination of a large time jitter among a plurality of data packets carrying the VoIP data, or by the loss of an excessive number of packets, or an excessive MOS score or a determined excessive packet delay (transmission or received). Determination of an excessive time jitter, number of lost packets, Mean Opinion Score (MOS) score or delay, may be determined by a processor maintaining a count of the appropriate condition per unit time and comparing the determined values with corresponding threshold values. For example, a processor may determine a difference in time of arrival of packets and maintain a count of those differences greater than a first known threshold. At the conclusion of a unit time period the count of the differences greater than a first known threshold are compared to a threshold associated with, in this case, time jitter, and determine whether excessive time jitter exists. An indication of non-optimal performance may then be indicated.

FIG. 4 illustrates an exemplary causality matrix associated with the model shown in FIG. 2 and causality graph or map shown in FIG. 3 for determining a root-cause of an observed event or symptom. In this form, the mapping illustrates the relationship along which observed events propagate from causing events, wherein the relationship value (i.e, "1"), indicates that a symptom is caused or generated by the associated event. Although the relationship value is shown as deterministic (i.e., 100 percent probability of occurring), it should be recognized that the value may also represent a probability of an event causing a symptom to occur. Hence, the value may also be probabilistic.

In this exemplary matrix when a indication of "down" is observed, the cause of such a indication may be associated with the host being non-operational or one of the performance criteria is so excessive that the service is not performing at all. Similarly, if an indication of non-optimal performance is observed, the root-cause may be that at least one of the performance parameters has exceeded its associated threshold value. Information regarding different performance parameters may be determined and provided by well-known methods as previously described.

In some aspects of the network processing, although a failure may occur, symptom(s) may, or may not, be generated to indicate that a component is experiencing failures. The root-cause correlation described herein is powerful enough to be able to deal with scenarios in which symptoms are generated to indicate the cause of the failure. An analysis, e.g., a root cause analysis, of the VoIP network, similar to that described in the aforementioned related US patent application may be used to determine from the exemplary causality or behavior model(s) shown, herein. Root Cause analysis by the determination of a measure of the elements of the causality matrix shown in FIG. 4 may be used to determine the most likely root cause of the one or more of the observed symptoms. Such root cause analysis is described in detail in commonly-owned U.S. Pat. No. 7,107,185, issued on Nov. 1, 2005 to Yemini, Y., et al., the contents of which are incorporated by reference herein. In one aspect, a most likely causing event may be determined by determining a minimum Hamming distance between a plurality of observed events and the causing events.

As presented herein, the VoIP system resides on or "hosted by" existing network components that may generate alarm indications, associated with errors, independent of corresponding alarm indications that may be generated by the VoIP system. For example, when a port fails on a host, the host may generate a failure report, i.e., an event, trigger, alarms, etc., while the VoIP system may generate a port failure report and the VoIP performance may be degraded. The network failure reporting may further be performed by a second failure system. Thus, performance behavior of a network composed of IP and over-layed VoIP components may be analyzed by formulating behavior models for selected ones of the components,—i.e., managed components—in each of the IP, and VoIP system networks and the VoIP performance domain. An analysis of the each of the networks (referred to as domains) may be separately performed and the results of each analysis may then be correlated through a behavior model which combines the characteristics of each of the domains. Such cross-correlation of the information from the individual networks or domains further refines the analysis provided to a user by removing one or more redundant alarms and providing only the most-likely cause of the alarm indications (i.e., observed events).

Figure 5:
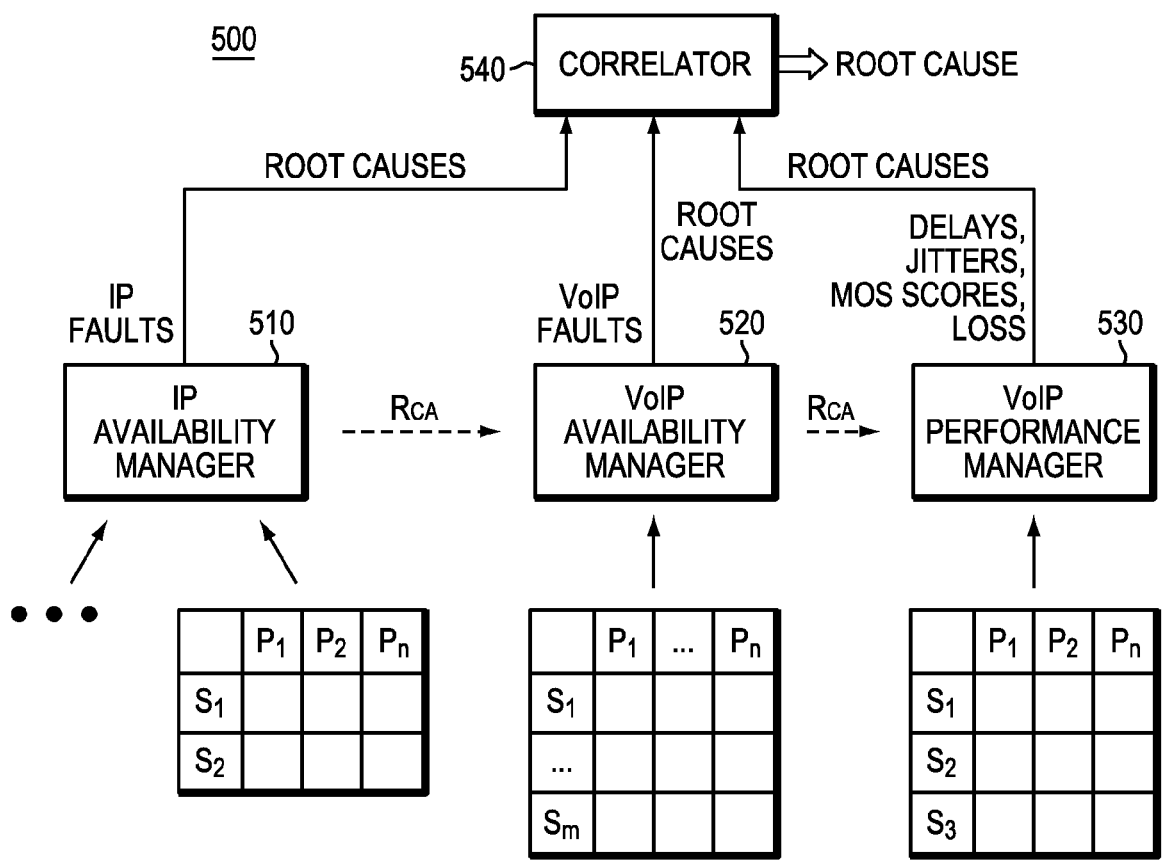
FIG. 5 illustrates a block diagram of an integration of a VoIP performance manager into a system for performing analysis of a VoIP network.

FIG. 5 represents a block diagram 500 illustrating the integration of the processing of the instant application with similar processing to determine the source or root cause of observed events or symptoms. In this illustrated example, each of a managers associated with the elements of an IP network 510, a VoIP availability manager, 520, and a VoIP performance manager reference an associated causality matrix which determine most-likely causing events (problems) from a plurality of observed events. The selected most-likely causing events from each of the mangers 510, 520, and 530 are provided to a correlator 540 which analyzes the received causing event to determine at least one most-likely causing event. The correlator may include information regarding the relationship of components within each of the domains. For example, a host or application may be considered a managed component in each of two domains and the knowledge of this component being an intersection point between two domains may be used to resolve ambiguity in the causing event associated with observed events in each of two domains.

Although not shown it would be recognized that the behavior model described herein may further provide sufficient information to perform an impact analysis, i.e., the affect of a degradation, on the VoIP performance domain. In this case, it may be determined what symptoms may be expected when a problem is introduced or simulated. Impact analysis using the behavior models described herein is more fully described in the aforementioned US patents and patent application and need not be discussed in detail herein. In another aspect, the impact of failures may be projected to determine the impact of a degradation on a higher level function.

The examples provided herein are described with regard to root-cause analysis and impact analysis, it would be recognized that the method described herein may be used to perform a system analysis may include: fault detection, fault monitoring, performance, congestion, connectivity, interface failure, node failure, link failure, routing protocol error, and/or routing control errors.

Figure 6:
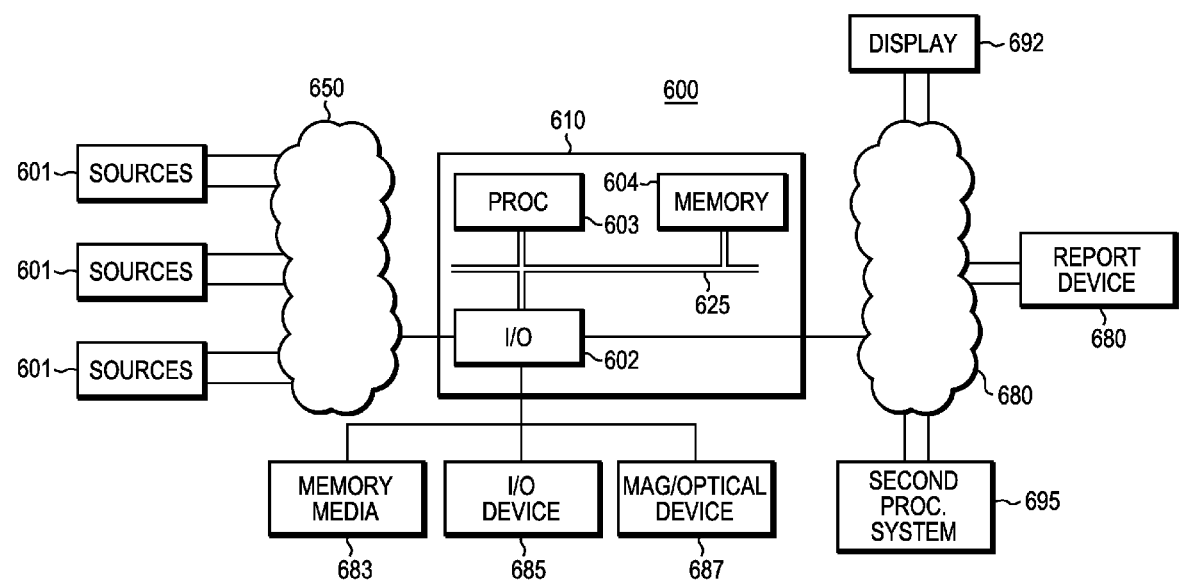
FIG. 6 illustrates a system implementing the processing shown herein.

FIG. 6 illustrates an exemplary embodiment of a system 600 that may be used for implementing the principles of the present invention. System 600 may contain one or more input/output devices 602, processors 603 and memories 604. I/O devices 602 may access or receive information from one or more devices 601, which represent sources of information. Sources or devices 601 may be devices such as routers, servers, computers, notebook computer, PDAs, cells phones or other devices suitable for transmitting and receiving information responsive to the processes shown herein. Devices 601 may have access over one or more network connections 650 via, for example, a wireless wide area network, a wireless metropolitan area network, a wireless local area network, a terrestrial broadcast system (Radio, TV), a satellite network, a cell phone or a wireless telephone network, or similar wired networks, such as POTS, INTERNET, LAN, WAN and/or private networks, e.g., INTRANET, as well as portions or combinations of these and other types of networks.

Input/output devices 602, processors 603, e.g. Pentium processors, and memories 604 may communicate over a communication medium 625. Communication medium 625 may represent, for example, a bus, a communication network, one or more internal connections of a circuit, circuit card or other apparatus, as well as portions and combinations of these and other communication media. Input data from the sources or client devices 601 is processed in accordance with one or more programs that may be stored in memories 604 and executed by processors 603. Memories 604 may be any magnetic, optical or semiconductor medium that is loadable and retains information either permanently, e.g. PROM, or non-permanently, e.g., RAM. Processors 603 may be any means, such as general purpose (e.g., Intel Corporation Pentium processor) or special purpose computing system, such as a laptop computer, desktop computer, a server, handheld computer, or may be a hardware configuration, such as dedicated logic circuit, or integrated circuit. Processors 603 may also be Programmable Array Logic (PAL), or Application Specific Integrated Circuit (ASIC), etc., which may be "programmed" to include software instructions or code that provides a known output in response to known inputs. In one aspect, hardware circuitry may be used in place of, or in combination with, software instructions to implement the invention. The elements illustrated herein may also be implemented as discrete hardware elements that are operable to perform the operations shown using coded logical operations or by executing hardware executable code.

In one aspect, the processes shown herein may be represented by computer readable code stored on a computer readable medium. The code may also be stored in the memory 604. The code may be read or downloaded from a memory medium 683, an I/O device 685 or magnetic or optical media, such as a floppy disk, a CD-ROM or a DVD, 687 and then stored in memory 604. Similarly the code may be downloaded over one or more networks, e.g., 650, 680, or not shown via I/O device 685, for example, for execution by processor 603 or stored in memory 604 and then accessed by processor 603. As would be appreciated, the code may be processor-dependent or processor-independent. JAVA is an example of processor-independent code. JAVA is a trademark of the Sun Microsystems, Inc., Santa Clara, Calif. USA.

Information from device 01 received by I/O device 602, after processing in accordance with one or more software programs operable to perform the functions illustrated herein, may also be transmitted over network 80 to one or more output devices represented as display 692, reporting device 690 or second processing system 695.

As one skilled in the art would recognize, the term computer or computer system may represent one or more processing units in communication with one or more memory units and other devices, e.g., peripherals, connected electronically to and communicating with the at least one processing unit. Furthermore, the devices may be electronically connected to the one or more processing units via internal busses, e.g., ISA bus, microchannel bus, PCI bus, PCMCIA bus, etc., or one or more internal connections of a circuit, circuit card or other device, as well as portions and combinations of these and other communication media or an external network, e.g., the Internet and Intranet.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A method for modeling and analyzing performance of a Voice-over-Internet Protocol (VoIP) configuration, composed of a plurality of components, said method comprising the steps of:
   one or more computers generating a model representing selected ones of the plurality of components and relationships among the selected components, wherein said component representations are selected from the group of configuration non-specific representations consisting of: VoIP-DHCP Service, VoIP-CallOperation Service, VoIP_Signaling Service, VoIP_MediaGateway Service and VoIP_SIP Service, and wherein the representations of relationships are selected from the group of configuration non-specific representations consisting of: HostedBy/HostsServices and Integrates/IntegratedIn;
   the one or more computers generating a mapping between a plurality of first events and a plurality of second events occurring in the selected components, said mapping representing the relationships along which the first events propagate among the selected components, and
   the one or more computers determining at least one first event based on at least one of the plurality of second events by determining a measure between each of a plurality of relationship values associated with the plurality of first events and the plurality of second events.

2. The method as recited in claim 1, further comprising the step of:
   representing selected ones of the plurality of components, and associated relationships, associated with each of a plurality of domains, wherein at least one of the plurality of components is associated with at least two of the domains;
   providing a mapping between a plurality of first events and a plurality of second events occurring in components in each of the domains, wherein selected ones of the first events and second events are associated with the at least one component associated with at least two of the domains;
   determining at least one first event based on at least one of the plurality of second events by determining a mismatch measure between each of a plurality of relationship values associated with the plurality of first events and the plurality of second events in each domain; and determining a likely first event by correlating the likely first events associated with each of the domains.

3. The method as recited in claim 1, wherein the first and second events are selected from the group consisting of: causing events, observable events, problems, symptoms.

4. The method as recited in claim 1, wherein the values are selected from the group consisting of: deterministic and probabilistic.

5. The method as recited in claim 1, wherein said measure is a Hamming distance.

6. An apparatus for analyzing a Voice-over Internet Protocol (VoIP) configuration containing a plurality of components, the apparatus comprising:

a processor in communication with a memory, the processor executing computer code for executing the steps of:

representing, in a model on one or more computers, selected ones of the plurality of components and relationships among the selected components, wherein said component representations are selected from the group of configuration non-specific representations consisting of: VoIP-DHCP Service, VoIP-CallOperation Service, VoIP_Signaling Service, VoIP_MediaGateway Service and VoIP_SIP Service, and wherein the representations of relationships are selected from the group of configuration non-specification representations consisting of: Hostedby/HostsServices and Integrates/IntegratedIn;

providing a mapping between a plurality of first events and a plurality of second events occurring in the selected components, said mapping representing the relationships along which the first events propagate among the selected components, and determining at least one first event based on at least one of the plurality of second events by determining a measure between each of a plurality of relationship values associated with the plurality of first events and the plurality of second events.

7. The apparatus as recited in claim 6, wherein the processor further executing code for executing the step of:

representing selected ones of the plurality of components, and associated relations, associated with each of a plurality of domains, wherein at least one of the plurality of components is associated with at least two of the domains;

providing a mapping between a plurality of first events and a plurality of second events occurring in components in each of the domains, wherein selected ones of the first events and second events are associated with the at least one component associated with at least two of the domains;

determining at least first event based on at least one of the plurality of second events by determining a measure between each of a plurality of relationship values associated with the plurality of first events and the plurality of second events in each domain; and determining a likely first event by correlating the likely first events associated with each of the domains.

8. The apparatus as recited in claim 6, wherein the first and second events are selected from the group consisting of: causing events, observable events, problems and symptoms.

9. The apparatus as recited in claim 6, further comprising: an input/output device in communication with the processor.

10. The apparatus as recited in claim 6, wherein the values are selected from the group consisting of: deterministic and probabilistic.

11. The apparatus as recited in claim 6, wherein said measure is a Hamming distance.

12. A computer program product for analyzing a Voice-over Internet Protocol (VoIP) configuration containing a plurality of components, by providing instruction to a processor enabling the processor to execute the steps of:

representing, in a model on one or more computers, selected ones of the plurality of components and relationships among the selected components, wherein said component representations are selected from the group of configuration non-specific representations consisting of: VoIP-DHCP Service, VoIP-CallOperation Service, VoIP_Signaling Service, VoIP_MediaGateway Service and VoIP_SIP Service, and wherein the representations of relationships are selected from the group of configuration non-specification representations consisting of: Hostedby/HostsServices and Integrates/IntegratedIn;

providing a mapping between a plurality of first events and a plurality of second events occurring in the selected components, said mapping representing the relationships along which the first events propagate among the selected components, and determining at least one first event based on at least one of the plurality of second events by determining a measure between each of a plurality of relationship values associated with the plurality of first events and the plurality of second events.

13. The computer program product as recited in claim 12, further providing instruction for enabling the processor to execute the steps of:

representing selected ones of the plurality of components and associated relationship associated with each of a plurality of domains, wherein at least one of the plurality of components is associated with at least two of the domains;

providing a mapping between a plurality of first events and a plurality of second events occurring in components in each of the domains, wherein selected ones of the first events and second events are associated with the at least one component associated with at least two of the domains;

determining at least first event based on at least one of the plurality of second events by determining a measure between each of a plurality of relationship values associated with the plurality of first events and the plurality of second events in each domain; and determining a likely first event by correlating the likely first events associated with each of the domains.

14. The computer program product as recited in claim 12, wherein the first and second events are selected from the group consisting of: causing events, observable events, problems and symptoms.

15. The computer program product as recited in claim 12, wherein the values are selected from the group consisting of: deterministic and probabilistic.

16. The computer program product as recited in claim 12, wherein said measure is a Hamming distance.

17. The method as recited in claim 1, wherein the causing events are associated with performance issues selected from the group consisting of: jitter, Mean Opinion Score (MoS), delay and packet loss.

18. The apparatus as recited in claim 6, wherein the causing events are associated with performance issues selected from the group consisting of: jitter, Mean Opinion Score (MoS), delay and packet loss.

19. The computer-program product as recited in claim 12, wherein causing events are associated with performance issues selected from the group consisting of: jitter, Mean Opinion Score (MoS), delay and packet loss.

* * * * *